3,493,341
POROUS SILICA PARTICLES CONTAINING A
CRYSTALLIZED PHASE AND METHOD
Madeleine Le Page, Paris, Raymond Beau, Massy
(Essonne), and Jacques Duchene, Maison-Alfort,
France, assignors to Produits Chimiques Pechiney-
Saint-Gobain, Neuilly-sur-Seine, France
No Drawing. Filed Jan. 23, 1967, Ser. No. 610,787
Claims priority, application France, Jan. 31, 1966,
47,792
Int. Cl. C01b 33/18; B01j 11/58
U.S. Cl. 23—182    6 Claims

ABSTRACT OF THE DISCLOSURE

This invention is addressed to the preparation of porous silica particles which are at least partially crystallized by calcining silica gel at a temperature within the range of 800–1200° C. with the silica gel containng alkali atoms in an amount within the range of 1–10% by weight, calculated as $Na_2O$.

---

This invention relates to porous particles of silica containing a specified amount of specific foreign atoms.

Porous particles of different shapes and characteristics have found commercial use, especially in absorption and catalytic processes. Amongst the porous pieces, use is often made of porous particles or silica in which their specific surfaces and pore dimensions are determined by particular applications.

Aside from natural porous silica, such as diatomaceous earth, the porous silica particles are prepared generally by the precipitation of alkali metal silicates with an acid. Depending somewhat on the process conditions, it is possible to obtain highly divided silica by slow hardening of gels which, when crushed, produce fragments having a glassy appearance. With regard to such gels, considerable research has been expended towards establishing the conditions for precipitation and subsequent treatment, such as washing where a product of predetermined characteristics can repeatedly be produced.

Gels, and particularly silica gel, tend to form into granules of rounded shape, such as substantially perfect spheres, which exhibit high impact strength and wear resistance by comparison with crushed gel fragments of irregular shapes. Gel grains of spherical shape, which can be produced in dimensions ranging from a fraction to several millimeters, find excellent use in the processes which employ moving or fluidized contact beds. The techniques which have been employed in the preparation of such gel globules rely upon the surface of the silica sol introduced as droplets into various fluids in which they are maintained until formed to globular shape and solidify sufficiently for manipulation in subsequent treatments, such as washing. Such fabricating techniques, which can be carried out in a continuous fashion, require careful regulation of the conditions for operation, particularly in the reaction conditions of the substances in forming the gelatinizing sols and the thermal condition for gelation so that the droplets will gel into globules within a predetermined length of time.

The grains of silica gel usually employed in commercial practice, whether irregular or round, generally have a large specific surface which often exceeds several hundred $m.^2/g.$ and a porosity in which the pores are of some 10 angstroms whereby they find particular use for various absorption systems.

For a number of applications, particularly in catalysis and absorption, the need is for porous silica particles having a specific area within the range of 1 $m^2./g.$ to 40–60 $m.^2/g.$ and with the pores of a uniform dimension within the range of 10 to 10,000 angstroms.

It has been found that silica gel grains, at least partially transformed to a crystallized phase, are capable of presenting these different characteristics while providing grains of high thermal stability and strength.

It is an object of this invention to produce and to provide a method for producing porous particles of silica which are at least partially crystallized and it is a related object to produce and to provide a method for producing porous silica particles in the form of calcined silica gel containing atoms of an alkali metal in an amount within the range of 1–10% by weight, calculated as $Na_2O$, with calcination being carried out at a temperature within the range of 800–1200° C. and preferably within the range of 800–1000° C. for a time sufficient to achieve the desired transformation of the silica gel to crystallized silica and it is a related object to make use of same in the processes of catalysis and absorption.

The various allotropic forms of silica and their respective stabilities are well known. However, transformation from one phase to another is a complicated phenomenon, the rate of which depends somewhat on such factors as working conditions such as concentration, temperature, pressure and the chemical effect of the reaction medium and interaction between silica and substances constituting the reaction medium, as well as the textural characteristics of the silica. Unexpected but frequent apparition of crystallization phases from their field of thermodynamic stability is also effected by the conditions described. For this reason, an indication cannot be given of all of the cases which present silica grains capable of being treated in accordance with the practice of this invention. Even with the most usual procedure wherein the alkali atom containing gel, which is most often obtained from alkali metal silicates, such as sodium silicate, reacted with an acidic substance such as sulphuric acid, it is possible to obtain silica gel grains having a wide variety of characteristics. Variation in the pH of precipitation and differences in the manner of washing the gel grains give variations in the amount of unneutralized alkali and a variable amount of alkali sulphate which can act as an inhibitor to the allotropic transformations obtained during calcination. The amount of alkali sulphate is important for it has an effect on the texture of the grains. Thus, it will be evident that it is possible to obtain wide variations in the characteristics and texture of the porous silica particles which are at least partially crystallized in accordance with the different combinations of conditions which may be employed.

The following examples are given by way of illustration, but not by way of limitation, for producing porous particles of silica at least partially crystallized.

EXAMPLE 1

This example illustrates the preparation of porous silica particles partially crystallized to crystobalite, having a specific surface and porosity differing in accordance with the amount of alkali atoms present in the uncombined sulphate state and expressed in percent of free oxide $Na_2O$ although probably bound to silica.

Silica globules of 1 to 5 mm. in diameter, obtained by coagulation of silica sol in a water immiscible liquid in which the silica sol is formed by acidification of sodium silicate with sulphuric acid, are subdivided into two portions and washed at different pH. The silica gel globules of the first portion contain 2.35% by weight $SO_3$, combined with a corresponding amount of $Na_2O$ to form the neutral sulphate and 0.78% by weight of free alkali calculated as $Na_2O$. The silica globules of the second portion contain 2.4% by weight $SO_3$ combined with a corresponding amount of $Na_2O$ to form the neutral sulphate and 4.3% of free alkali atom calculated as $Na_2O$. Both portions are calcined for one hour at 810° C.

Each portion was analyzed for the percent of crystalized phase obtained, the specific surface in $m.^2/g.$ and the pore dimension in A., the porous volume in $cm.^3/g.$ The results are set forth in the following tabulation. Included also are the characteristics of the globules before treatment.

TABLE I

| Portion | Uncalcinated characteristics | Calcination conditions | Specific surface of the calcinated globules, $m.^2/g.$ | Porous volume, $cm.^3/g.$ | Pore dimension in A. | Obtained crystallized phase |
|---|---|---|---|---|---|---|
| 1 | Specific surface, 275 $m.^2/g.$; porous volume, 0.61 $cm.^3/g.$; percent $SO_3$, 2.35; percent $Na_2O$, free 0.78. | 1 hour, 810° C | 4 | 0.2 | 300 to 1,000 | Crystobalite about 10%. |
| 2 | Specific surface: 297 $m.^2/g.$; porous volume: 0.64 $cm.^3/g.$; percent $SO_3$: 2.40; percent $Na_2O$: free 4.30. | 1 hour 810° C | 1 | 0.16 | 1,300 to 3000 | Crystobalite at least 50%. |

It will be apparent that the porous volumes of both of the calcined portions are similar and that the calcined grains are mechanically strong but that the porous repartitions differ considerably, although within a narrow range, and that the globules containing the larger amount of free $Na_2O$ have the greater amount of crystallized phase.

EXAMPLE 2

This example illustrates the retarding effect of sodium sulphate on crystallization. The silica globules are prepared in the same manner as in Example 1 with the washing differing between the two portions to give different quantities of alkaline sulphate. Both portions are calcined at 810° C. The following sets forth some of the data secured by analysis of the mechanically strong products obtained from the two portions:

TABLE II

| Portion | Uncalcinated characteristics | Calcination conditions | Specific surface of the calcinated globules, $m.^2/g.$ | Porous volume, $cm.^3/g.$ | Pore dimension in A. | Obtained crystallized phase |
|---|---|---|---|---|---|---|
| 1 | Specific surface, 340 $m.^2/g.$; porous volume, 0.54 $cm.^3/g.$; percent $SO_3$, 4.37; percent $Na_2O$, free 1.34. | 1 hour 810° C | 2.4 | 0.27 | 1,000 to 3,000 | Crystobalite at least 60%. |
| 2 | Specific surface: 350 $m.^2/g.$; porous volume, 0.54 $cm.^3/g.$; percent $SO_3$: 8.50; percent $Na_2O$, free 1.85. | 3 hours 810° C | 6 | 0.23 | 800 to 1,500 | Crystobalite about 20%. |

EXAMPLE 3

This example has to do with the treatment of globules of small dimension within the range of 40 to 100μ obtained by gelification of silica sol globules.

The globules are treated as in the preceding examples. The following is a tabulation of the characteristics of the starting material and the products obtained by the two different calcination condition set forth in the table.

TABLE III

| Globules between 40 and 100μ | Calcinated Conditions | Specific surface of the calcinated globules | Porous volume, $cm.^3/g.$ | Pore dimensions in A. | Obtained crystallized phase |
|---|---|---|---|---|---|
| Specific surface, 215 $m.^2/g.$; porous volume, 0.85 $cm.^3/g.$ $Na_2O$ "free," 1.4%. | 1 hour at 850° C | 13 | 0.45 | 500 to 1,500 | Crystobalite about 5%. |
|  | 1 hour at 900° C | 1.6 | 0.35 | 1,200 to 3,000 | Crystobalite at least 80%. |

It will be apparent from the foregoing that we have provided a composition and method for producing porous silica particles which are at least partially crystallized. Such particles find excellent use in the processes of catalysis and absorption.

It will be understood that changes may be made in the details of formulation and conditions of operation without departing from the spirit of the invention, especially as defined in the following claims.

What is claimed is:

1. In the process of preparing porous silica particles which are at least partially crystallized, the steps of calcining silica gel patricles at a temperature within the range of 800–1200° C. in which the silica gel contains an amount of alkali atoms with the range of 1–10% by weight of the gel, calculated as $Na_2O$, and in which the silica gel particles are obtained by coagulation of silica gel and crushing the silica gel to particles.

2. The process as claimed in claim 1 in which the calcination is carried out at a temperature within the range of 800–1000° C.

3. The process as claimed in claim 1 in which the silica gel particles are obtained by coagulation of silica gel globules in a water immiscible fluid.

4. The process as claimed in claim 1 in which the silica gel is formed by the reaction of an alkali metal silicate with an acid.

5. The process as claimed in claim 4 in which the alkali metal silicate is sodium silicate and in which the acid is sulphuric acid.

6. Porous silica particles, at least a portion of which are in the crystallized phase, prepared by the process of claim 1.

References Cited

UNITED STATES PATENTS

| | | | |
|---|---|---|---|
| 2,161,186 | 6/1939 | Morgan et al. | 252—451 X |
| 3,383,172 | 5/1968 | Biegler et al. | 23—182 |

DANIEL E. WYMAN, Primary Examiner

C. F. DEES, Assistant Examiner

U.S. Cl. X.R.

252—451